No. 746,466. PATENTED DEC. 8, 1903.
W. A. CORNELL.
MEANS FOR ATTACHING BRAKE DRUMS TO THE HUBS OF WHEELS OF VEHICLES.
APPLICATION FILED JUNE 23, 1903.
NO MODEL.
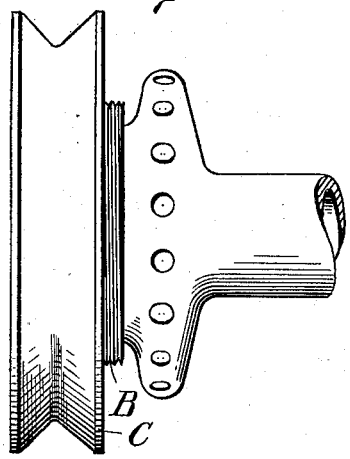
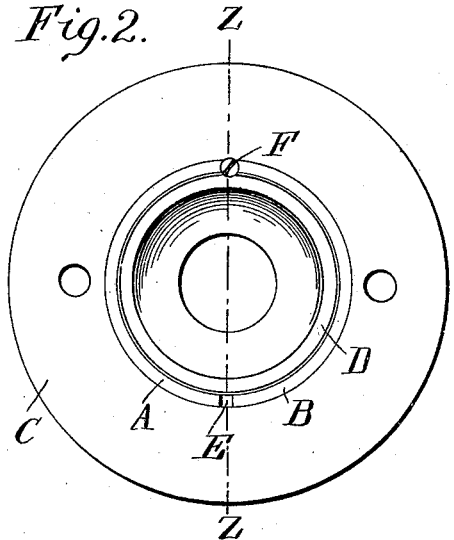
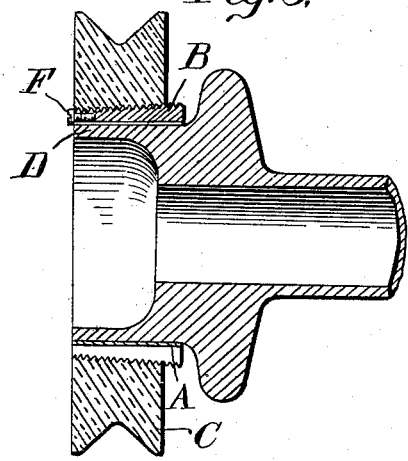
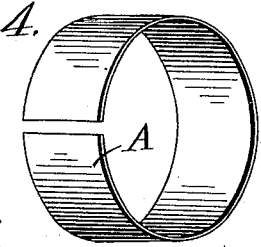
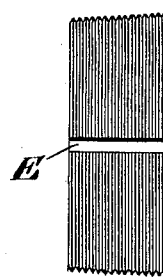
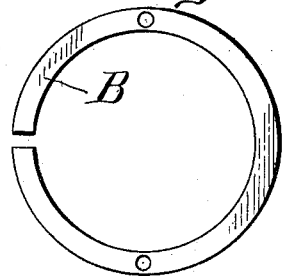

No. 746,466. Patented December 8, 1903.

UNITED STATES PATENT OFFICE.

WILLIAM ALBERT CORNELL, OF TOORAK, NEAR MELBOURNE, VICTORIA, AUSTRALIA.

MEANS FOR ATTACHING BRAKE-DRUMS TO THE HUBS OF WHEELS OF VEHICLES.

SPECIFICATION forming part of Letters Patent No. 746,466, dated December 8, 1903.

Application filed June 23, 1903. Serial No. 162,809. (No model.)

*To all whom it may concern:*

Be it known that I, WILLIAM ALBERT CORNELL, a subject of the King of Great Britain, residing at No. 220 Williams road, Toorak, near Melbourne, in the State of Victoria and Commonwealth of Australia, have invented new and useful Improved Means for Attaching Brake-Drums to the Hubs of Vehicle-Wheels, of which the following is a specification.

This invention relates to certain new and useful improvements in means for attaching brake-drums to the hubs of vehicles, and aims particularly to provide new and novel means by which the brake-drum may be easily and quickly applied to the hub of a vehicle or other wheel without mechanical skill and without interfering with the hub at all. These means consist of the combination, with the brake-drum, the internal periphery of which is provided with a tapered screw-thread, of a tapered sleeve externally screw-threaded to receive the thread on the internal periphery of the drum and a liner, both sleeve and liner being capable of circumferential compression.

Referring to the drawings, Figure 1 is an elevation showing portion of the hub of a bicycle-wheel with the drum in position. Fig. 2 is an end view of Fig. 1. Fig. 3 is a sectional elevation of Fig. 1 on the line Z Z, Fig. 2. Fig. 4 is an isometric projection of the liner. Fig. 5 is an elevation, and Fig. 6 a plan, of the sleeve.

A is a liner or packings trip or band, and B a tapered sleeve, the latter being externally screw-threaded to receive the brake-drum C, the internal periphery of which has a tapering thread to fit the thread on the tapered sleeve. The liner A consists of a flat piece of steel or other resilient metal bent into a circular form in such a way that the two ends do not meet. In use it is sprung onto the hub D of the back wheel and the tapered sleeve B pushed over it. The tapered sleeve has a slot E cut right through it from one side to the other, so that it is capable, like the liner A, of a certain amount of compression. The liners are made of varying thicknesses to fit hubs of varying sizes and to allow of the sleeve fitting firmly thereon. When the liner A and sleeve B have been placed in position on the hub D, the brake-drum C is screwed onto the sleeve, with the result that both the sleeve and the liner will be compressed and gripped firmly on the hub without any possibility of slipping. The liner must be of such a thickness that the drum does not quite reach the flange of the hub upon being screwed tight. In Figs. 1 and 3 the drum is shown not screwed right home on the sleeve. The hub may be coated with some thin adhesive mixture and a little powdered resin or sand dusted onto it before placing the liner thereon.

If thought desirable, the brake-drum C can be locked upon the sleeve by means of a small screw F, inserted in the outer edge of the sleeve B, so that when screwed home its head will press against the face of the drum, and thus all liability of unscrewing is avoided.

The putting on of the brake has the effect of automatically tightening the grip upon the hub, so that the greater the strain the more effectual the grip.

It is of course obvious that my invention is applicable to any brake-drum, whether it has a circumferential V-shaped groove or not, and it is also immaterial as to how the band is applied to the drum, as this may be effected in any approved manner.

Having now particularly described and ascertained the nature of my said invention and in what manner the same is to be performed, I declare that what I claim is—

1. The combination with a brake-drum provided with a tapered threaded orifice and a wheel-hub, of a tapered resilient metallic band mounted upon the hub and having its ends separated, a resilient metallic tapered split sleeve, said sleeve being exteriorly screw-threaded and engaging the screw-threads of the orifice in the drum, said band and sleeve being capable of circumferential compression, and an assembling device carried by the smaller end of the sleeve and engaging the outer face of the drum to hold the latter against separation from the hub.

2. The combination with a brake-drum provided with a tapered threaded orifice and a wheel-hub, of a tapered resilient metallic band mounted upon the hub and having its ends separated, a resilient metallic tapered split sleeve, said sleeve being exteriorly screw-threaded and engaging the screw-threads of the orifice in the drum, said band and sleeve being capable of circumferential compression, and a headed screw housed in the smaller end of the sleeve and having its head bearing against the outer face of the drum.

In testimony whereof I have signed my name to this specification in the presence of two subscribing witnesses.

WILLIAM ALBERT CORNELL.

Witnesses:
WALTER SMYTHE BAYSTON,
FRANK BAYSTON.